(12) United States Patent
Nevin

(10) Patent No.: US 6,334,491 B1
(45) Date of Patent: Jan. 1, 2002

(54) SELF-SUPPORTING FIELD MARKER

(76) Inventor: Jim Nevin, R.R.#1, Rapid City Manitoba (CA), R0K 1W0

(*) Notice: Subject to any disclaimer, the term of this patent is extended or adjusted under 35 U.S.C. 154(b) by 0 days.

(21) Appl. No.: 09/590,372

(22) Filed: Jun. 9, 2000

(30) Foreign Application Priority Data

Feb. 14, 2000 (CA) .............................................. 2298369

(51) Int. Cl.[7] .............................................. A01B 25/00
(52) U.S. Cl. ...................................................... 172/126
(58) Field of Search ............................... 172/126, 127, 172/128, 129

(56) References Cited

U.S. PATENT DOCUMENTS

| | | | |
|---|---|---|---|
| 3,747,148 A | * 7/1973 | Hitchcock | 172/126 |
| 3,903,970 A | * 9/1975 | Grataloup | 172/126 |
| 4,207,950 A | * 6/1980 | Kinzenbaw | 172/126 |
| 4,449,725 A | * 5/1984 | Robinson et al. | 280/78 |
| 4,512,416 A | 4/1985 | Smith | |
| 4,583,598 A | * 4/1986 | Knels | 172/126 |
| 4,674,578 A | * 6/1987 | Bexten et al. | 172/126 |
| 5,027,525 A | 7/1991 | Haukaas | |
| 5,425,427 A | 6/1995 | Haugen | |
| 5,474,135 A | * 12/1995 | Schlagel | 172/151 |
| 5,542,190 A | * 8/1996 | Wahls | 172/126 |
| 5,573,070 A | * 11/1996 | Meek et al. | 172/131 |
| 5,785,128 A | 7/1998 | Redekop | |
| 5,957,216 A | * 9/1999 | Redekop | 172/126 |
| 6,019,178 A | * 2/2000 | Redekop | 172/126 |

\* cited by examiner

Primary Examiner—Thomas B. Will
Assistant Examiner—Nathan Mammen
(74) Attorney, Agent, or Firm—Adrian D. Battison; Michael R. Williams

(57) ABSTRACT

A field marker arranged for mounting on an agricultural implement at one side thereof includes a marker arm including a marker disk movable between a deployed position extending outwardly of the implement to one side thereof and a retracted position. The marker arm has an inner arm portion and an outer arm portion both of which are formed from two parallel beams with the disk on the outer end of a rear one of the beams. The inner arm portion is pivotal about a first horizontal axis and is supported on a ground wheel spaced outwardly to allow the marker arm to move upwardly and downwardly relative to the implement. The outer arm portion is mounted on the outer end of the inner arm portion for pivotal movement about a second parallel horizontal axis to allow the marker disk to move upwardly and downwardly relative to outer end of the inner portion which is supported on the wheel and to allow the outer portion to move to a retracted position on top of the inner portion. The whole marker arm is moved by a cylinder about a generally upright axis from the deployed position to the retracted position approximately 90° to the deployed position in which the marker arm trails rearwardly of the mounting member with the marker arm being supported by the ground wheel and free to pivot about the first horizontal axis in the deployed position, the retracted position and as it moves from the deployed position to the retracted position.

20 Claims, 8 Drawing Sheets

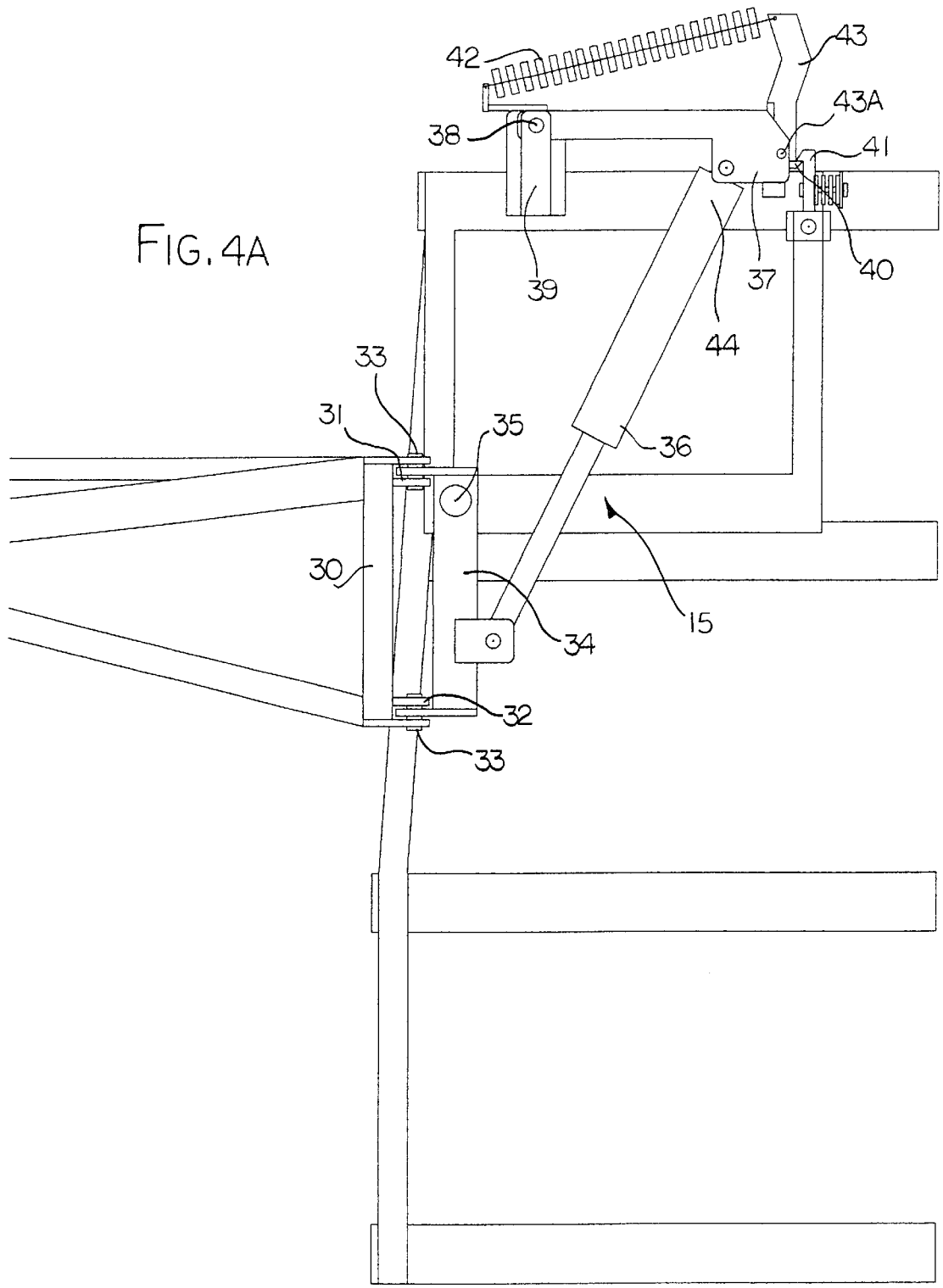

US 6,334,491 B1

SELF-SUPPORTING FIELD MARKER

This invention relates to a field marker for attachment to an agricultural implement for generating a mark in the field at a position spaced outwardly to one side of the implement, wherein the marker includes a self supporting arrangement reducing the amount of weight applied to the implement during operation.

BACKGROUND OF THE INVENTION

Markers for agricultural implements are used to allow the operator to more accurately drive the implement in a required direction as required spacing from a previous swath of the implement to avoid double coverage or missed spaces.

The most simple form of marker simply includes a disc or other element which scores a mark across the ground and is mounted on an arm which projects outwardly to one side of the implement to a distance approximating one half of the width of the implement.

As implements have become wider, the length of the arm has necessarily become longer thus increasing the amount of strength and weight necessary for the arm to ensure that the disc marker remains properly in position forming the required furrow. As the implement has also become wider, it will be necessary to provide a more complex folding action allowing the implement to a folded position for transport. Many seeders therefore have a double wing arrangement so that each wing section is formed of an inner portion and an outer portion so that as the inner section is folded to a vertical orientation the outer section is folded to a horizontal orientation upside down or even beyond the horizontal to a position depending downwardly toward the centre section.

In order to provide the necessary length of arm and in order to provide the mounting of the arm accommodating the folding action, folding markers have been developed which lie alongside the end beam of the implement in a retracted position and fold outwardly in two portions so as to extend the required length to the marker disc.

Examples of these designs of marker are shown in U.S. Pat. No. 4,512,416 (Smith), U.S. Pat. No. 5,425,427 (Haugen); U.S. Pat. No. 5,027,525 (Haukaas) and U.S. Pat. No. 5,785,128 (Redekop).

An additional problem for markers of this type is that the increased length and weight which has become necessary requires that the weight is to some extent transferred to the implement. All of the markers transfer some weight to the implement and particularly in the retracted position, all of the markers are supported on the implement and therefore their whole weight is carried on the implement. While the effect of the weight is reduced in the extended position, in some designs of seeder even this weight in the extended position is unacceptable since the weight tends to tilt the outer wing section thus interfering with the proper levelling action of the implement connections and thus interfering with the proper seeding depth. More specifically, the weight on the outside edge of the wing section of the implement causes the seeding elements adjacent that edge to seed to deeply while the seeder elements at the opposite edge of the wing section are raised and thus seed too shallowly.

For this reason implements manufactured by certain manufacturers have been unable to accommodate markers of this general type and up till now no marker has been available which could be used effectively while allowing the seeding depth to be properly maintained.

SUMMARY OF THE INVENTION

It is one object of the present invention, therefore, to provide an improved field marker which is at least partly self supporting during operation.

According to one aspect of the invention there is provided a field marker comprising:

a mounting member arranged for mounting on an agricultural implement at one side thereof;

a marker arm attached to the mounting member for movement between a deployed position extending outwardly of the implement to one side thereof and a retracted position;

a marker element carried on a free end of the marker arm for engaging the ground, when the arm is in the deployed position, and forming a mark on the ground parallel to movement of the implement across the ground;

the marker arm including an inner arm portion having an inner end attached to the mounting member and an outer arm portion attached to an outer end of the inner arm portion with the marker element on an outer end of the outer arm portion;

the inner arm portion being mounted on the mounting member for pivotal movement about a horizontal axis to allow the marker arm to move upwardly and downwardly relative to the implement;

a ground support wheel mounted on the inner arm portion so as to support the outer end of the inner arm portion relative to the ground;

the outer arm portion being mounted on the outer end of the inner arm portion for pivotal movement about a horizontal axis to allow the marker element to move upwardly and downwardly relative to the implement;

a deployment member for effecting pivotal movement of the marker arm about a generally upright axis from the deployed position to a retracted position approximately 90° to the deployed position in which the marker arm trails rearwardly of the mounting member;

the deployment member and the ground wheel being arranged relative to the marker arm such that the marker arm is supported by the ground wheel and is free to pivot relative to the mounting member about the horizontal axis in the deployed position, the retracted position and as it moves from the deployed position to the retracted position.

Preferably the ground wheel is a castor wheel.

Preferably the outer arm portion is pivotally mounted on the inner arm portion for movement from a deployed position extending outwardly of the inner arm portion to a retracted position folded alongside the outer arm portion.

Preferably the outer arm portion pivots about a substantially horizontal axis so as to move upwardly onto a top of the inner arm portion.

Preferably each of the outer arm portion and the inner arm portion comprises two parallel bars lying in a substantially horizontal plane.

Preferably the marker arm and the ground wheel are arranged such that the marker arm extends rearwardly over a top of the implement frame in the retracted position.

Preferably the marker arm and the mounting member are positioned within an outermost end member of the frame of the implement in a retracted position so as to avoid any projection beyond the outer most frame member.

Preferably there is provided an abutment post attached to the implement frame and standing upwardly therefrom at a position rearwardly of the mounting member for abutting the marker arm in the retracted position while allowing the marker arm to pivot upwardly and downwardly.

Preferably the latch post includes a latch member movable to a latch position to engage the marker arm as the implement is folded upwardly to a folded position of the implement.

Preferably each of the inner and outer marker arm portions includes two bars arranged in common plane with one in advance of the other and wherein the marker element comprises a disc for rolling on the ground and wherein one bar of the outer portion extends outwardly to a position adjacent or just beyond the disc in advance of the disc to act as a guard bar for impacting any obstacle in advance of the disc.

Preferably the mounting member includes a compression spring pushing down on the marker arm so as to transfer weight from the mounting member outwardly to the ground wheel.

Preferably the outer portion pivots upwardly and inwardly to a retracted position on top of the inner portion and wherein there is provided a lift cylinder for actuating movement of the outer portion while allowing pivotal movement of the outer portion relative to the inner portion when in the deployed position, the actuating cylinder including a lever pivotally mounted on the outer portion and including an abutment outwardly of the pivot for engaging the outer portion.

Preferably the lever includes a spring biasing the cylinder and lever into an overcenter position.

Preferably there is provided a cylinder for moving the arm from the deployed position to the retracted position and vice versa, a free end of the cylinder being mounted on a trip mechanism such that the marker arm can move to the retracted position if tripped by impact with an obstacle and such that when in the retracted position following a trip, the cylinder can be returned to the untripped position by actuating the cylinder to move the marker arm to the retracted position.

BRIEF DESCRIPTION OF THE DRAWINGS

One embodiment of the invention will now be described in conjunction with the accompanying drawings in which:

FIG. 4A is a top plan view similar to that of FIG. 4 but showing the marker in a deployed position.

DETAILED DESCRIPTION

Figure 1:
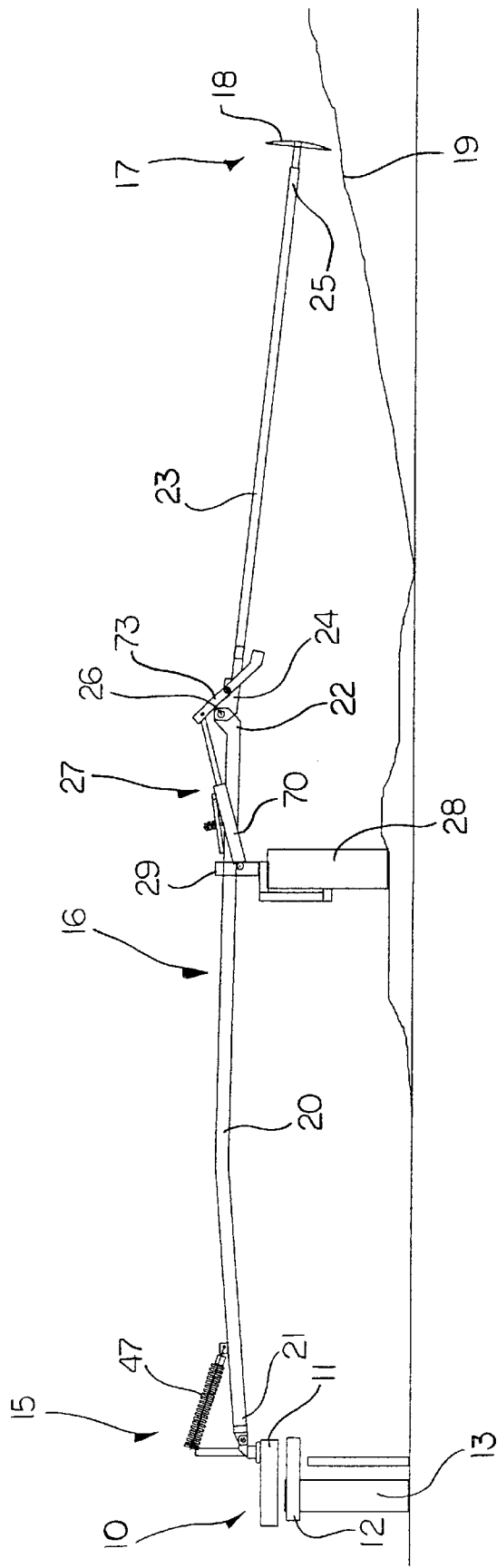
FIG. 1 is a front elevational view showing one end frame member of the implement and the marker attached thereto in deployed position for marking in the field.
Figure 2:
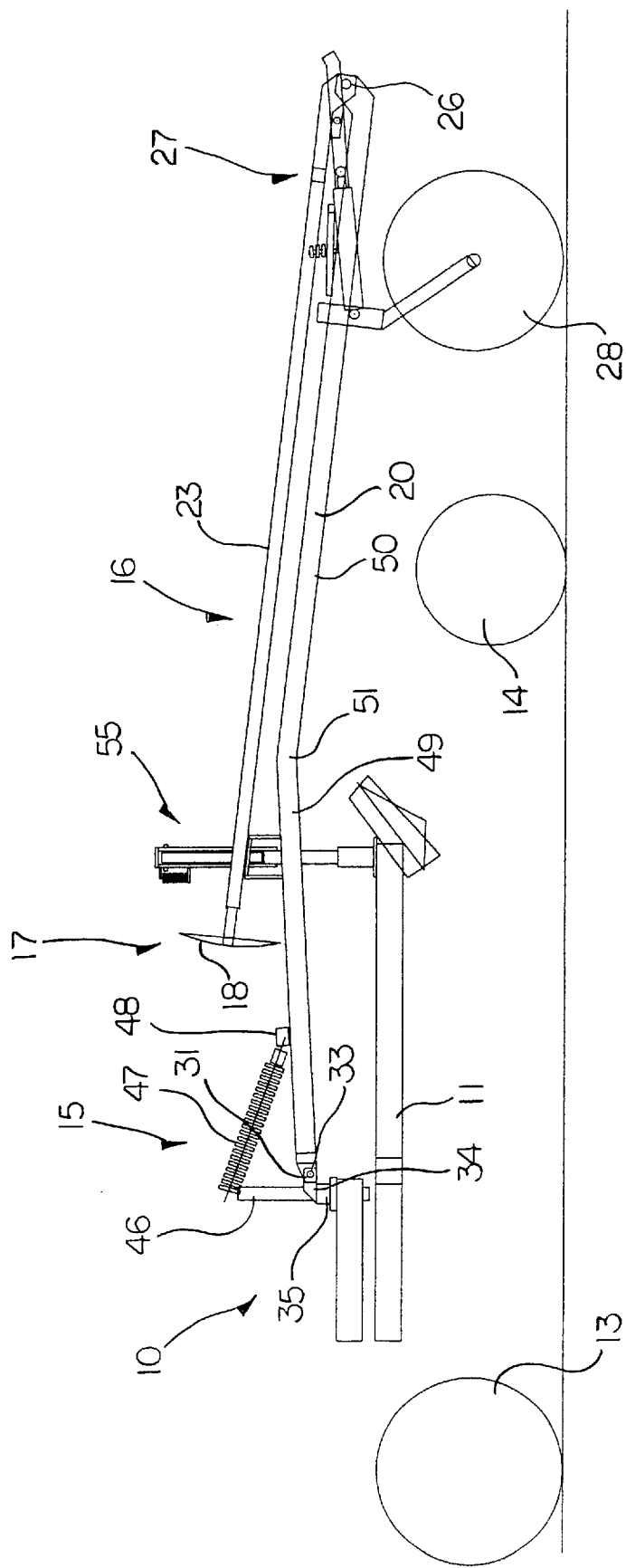
FIG. 2 is a side elevational view showing one end frame member of the implement and the marker attached thereto in retracted position for trailing behind the implement when not required.
Figure 3:
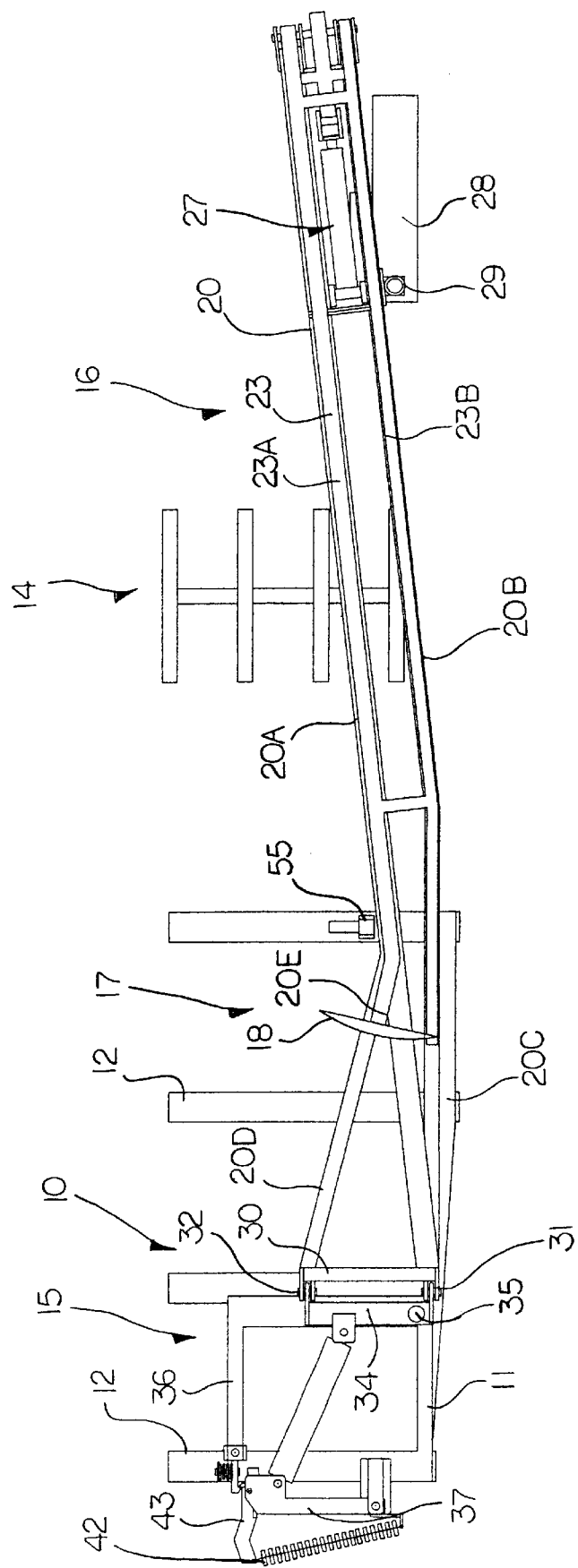
FIG. 3 is a top plan view of the marker and end portion of the implement in the retracted position of FIG. 2.

Turning firstly to FIGS. 1, 2 and 3, a frame of the agricultural implement is generally indicated at 10 and includes an end beam 11 together with a plurality of tool bars 12. The implement is shown only schematically since its construction and arrangement is well known to one skilled in the art and various different designs of implement are available from different manufacturers. One ground wheel for the implement is indicated at 13 and it will be appreciated again that the arrangement of ground wheels can vary so that the ground wheel is shown only schematically. The implement generally carries behind it a plurality of packer wheels and a rear most one of the packer wheels is indicated at 14 to show the extent of the implement. Generally the implement is a seeder but the seeding elements have been omitted for convenience of illustration since again these are well known to one skilled in the art and can vary depending upon requirements.

The marker according to present invention comprises a mounting member generally indicated at 15 and a marker arm generally indicated at 16. The marker arm 16 carries at its outer end a marker element 17 which is preferably in the form of a disc 18 mounted for rolling movement about an axis longitudinal of the arm so that the disc rolls on the ground 19 and forms a furrow which can be followed during the next swath of the implement.

The marker arm is thus movable from a deployed position shown in FIG. 1 in which it projects outwardly at right angles to the beam 11 to a position in which it trails behind the mounting member 15 so that it generally extends parallel to the beam 11 as shown in FIGS. 2 and 3.

The marker arm 16 includes an inner arm portion 20 extending from an inner end 21 to an outer end 22. The marker arm further includes an outer portion 23 extending from an inner end 24 to an outer end 25 at which is mounted the disc 18. The outer end 22 is connected to the inner end 24 by a pivot pin 26 which allows the outer portion to pivot upwardly and downwardly about an axis of the pivot pin 26 which extends parallel to the direction of movement that is at right angles to the length of the arm.

The outer portion 23 can be pivoted about the pin 26 from a deployed position in which the arm is substantially contiguous and extends outwardly to the disc 18 to the retracted position in which the outer portion 23 is pivoted to a position lying on top of the inner portion as shown in FIG. 2.

Movement from the deployed position to the retracted position is effected by an actuating cylinder arrangement generally indicated at 27.

The outer end 22 of the inner portion 20 is supported relative to the ground by a castor wheel 28 mounted for castoring movement about a support 29 which extends at right angles to the arm inner portion 20. The castor wheel is thus free to rotate about the vertical mounting 29 from a position in the deployed position of FIG. 1 in which the castor wheel follows behind the arm in the direction of movement of the arm which is thus at right angles to the length of the arm. In the retracted position shown in FIG. 3, the castor wheel again supports the outer end 22 of the inner portion 20 and extends generally in the direction of movement that is longitudinal of the arm so that the castor wheel trails behind the mounting member 29.

In general, therefore, the castor wheel acts to support the majority of the weight of the outer end of the inner portion during operation in the deployed position together with a part of the weight of the outer portion with the remainder of the weight of the outer portion being carried on the disc itself. Thus the majority of the weight of the arm is transferred to the wheel 28 thus reducing the amount of weight on the outside edge of the implement.

In general, in the retracted position shown in FIG. 3, a significant proportion of the weight of the arm including the inner portion and the outer portion is carried on the wheel and the amount thus carried on the implement is significantly reduced. The wheel is at all times in contact with the ground and the arm is free to pivot upwardly and downwardly so that the wheel remains in contact with the ground supporting the arm. In addition the wheel remains in contact with the ground during movement from the deployed position to the retracted position and vice versa and only the weight of the inner most part of the arm is carried on the implement itself in any one of these positions and situations.

Figure 4:
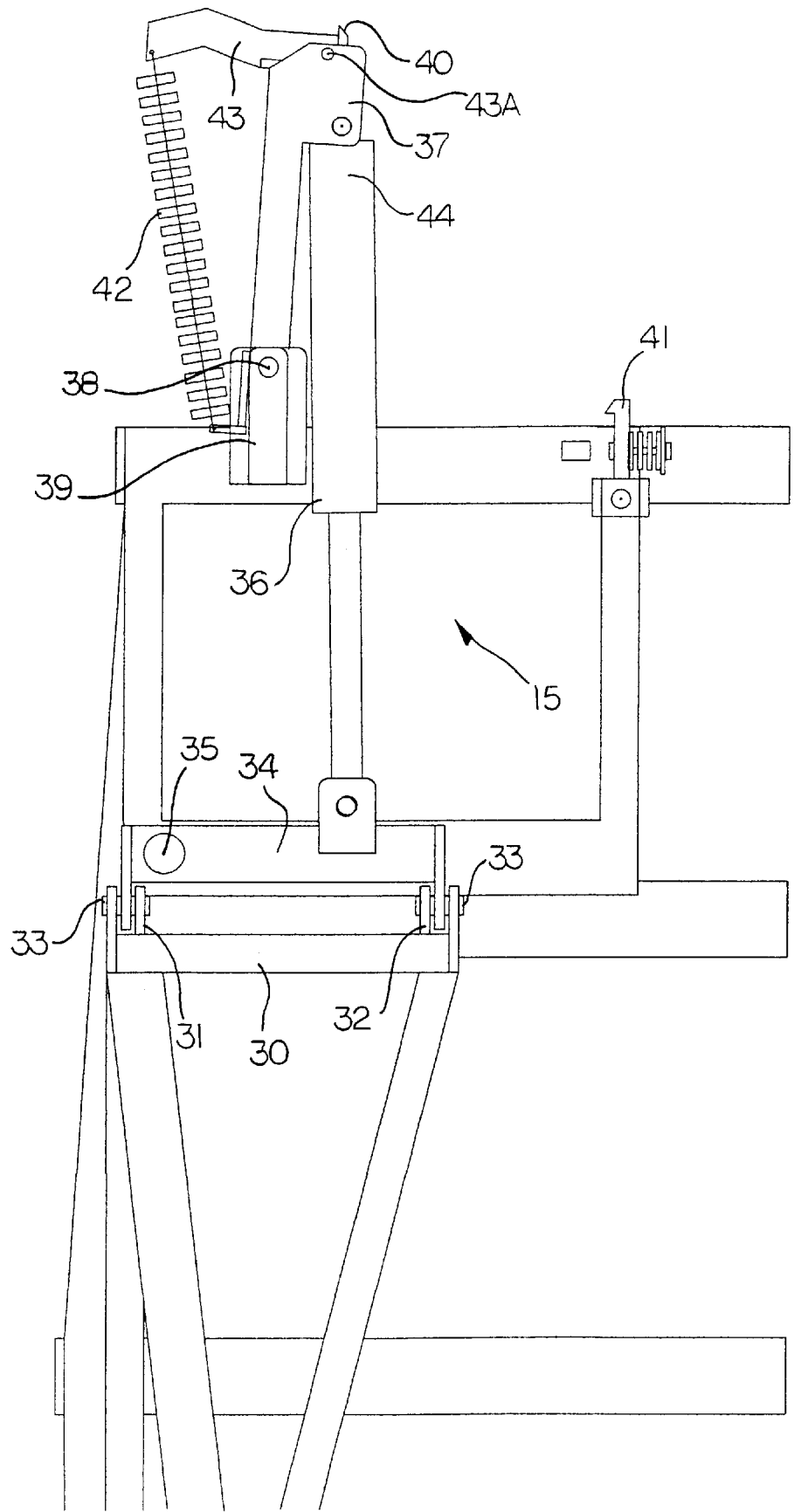
FIG. 4 is a top plan view similar to that of FIG. 3 on an enlarged scale showing the marker in a tripped position.

Turning now to FIGS. 1, 2, 3, 4 and 4A, the inner portion 20 of the marker arm includes an inner most support bar 30 to which the arm is rigidly attached so that the bar 30 pivots with the arm. The bar 30 is carried on a pair of pivot brackets 31 and 32 each having a pivot axle 33 defining a horizontal axis about which the arm can pivot. The brackets 31 and 32 are carried on an arm 34 at respective ends of the arm. The arm is mounted for pivotal movement about a post 35 adjacent one end of the arm so that the beam 34 can rotate from a first position shown in FIG. 4A in which the beam 34 is parallel to the end rail of the implement frame so that the arm projects out in its deployed position to a position in which the beam 34 is retracted as shown in FIGS. 3 and 4, thus moving the arm to its retracted position.

The beam 34 is moved by a cylinder 36 so that in a position shown in FIG. 3 which is a retracted position the cylinder is fully retracted. In an extended position of the cylinder the beam 34 is moved in a clockwise direction to the deployed position of FIG. 4A.

The inner end 44 of a cylinder 36 is mounted on a trip release arm 37 which is carried on a pivot 38 of a bracket 39 carried on the implement frame. The trip release arm 37 includes a latch abutment 40 which engages with a spring latch trigger 41. The trip release arm 37 is biased into its latched position shown in FIGS. 3 and 4A by a spring 42 extending from the pivot end of the trip release arm 37 to a lever arm portion 43 pivotally mounted at a pivot 43A on the trip release arm 37.

With the abutment 40 in engagement with the trigger 41, the inner end 44 of the cylinder 36 is held in position for actuating movement of the marker arm between its deployed and retracted position. In the event that the marker arm impacts an obstacle, the trip release arm 37 is released by pivotal movement of the lever 43 about pivot 43A from the trigger 41 allowing the marker arm to pivot into its retracted position while leaving the cylinder in its extended position.

The marker arm can be returned to its deployed position after a tripping action simply by operating the cylinder 36 to move to the retracted position and then re-extending the cylinder to the deployed position. This automatically resets the trip.

The mounting member 15 further includes a post 46 extending up from the post 35. A compression spring 47 extends from the top of the post 46 downwardly and outwardly to a bracket 48 on the top of the inner portion of the arm and thus applies a compression force pushing downwardly on the inner portion of the arm at its inner end thus acting to transfer loading from the mounting member 15 outwardly to the wheel 28. The spring 47 is optional and if the implement can accommodate the reduced loading on the mounting assembly 15 without detriment, the spring 47 may be omitted.

As shown in FIG. 2, the inner portion 20 includes a first section 49 and a second section 50 joined at an apex 51. The first section 49 has a reduced inclination so that it can pass over the top of the frame 11 thus allowing the arm to be retracted to a position shown in FIG. 3 in which the arm extends over the top of the tool bars 12 and generally parallel to the end rail 11. Changing in height of the ground can therefore be accommodated while the marker arm runs on its wheel 28 in the retracted position as shown in FIG. 2.

Figure 8:
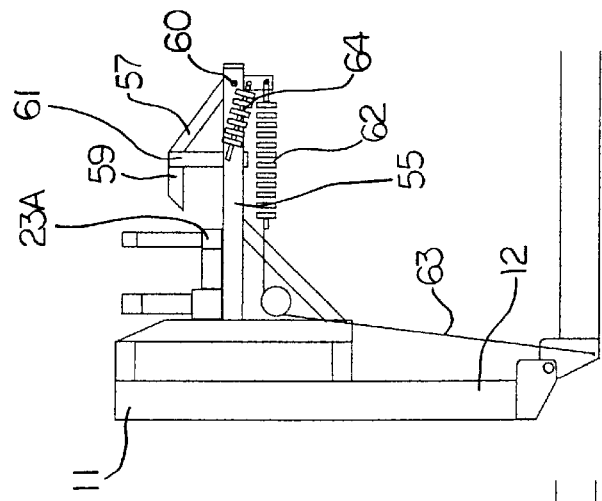
FIG. 8 is the same cross sectional view as that of FIG. 7 showing the one end frame member of the implement and the marker attached thereto in a partly folded transport position of the implement.

As shown in FIG. 3 and in FIG. 8, each of the inner portion 20 and the outer portion 23 is formed from two generally parallel beams 20A, 20B and 23A, and 23B. These generally parallel beams are interconnected at knuckle joints 26 so that the beam 20A is connected by a joint 26 to the beam 23A and the beam 20B is connected by a joint 26 to the beam 23B. This provides a very rigid structure of the arm allowing for significant strength to prevent damage should any impact occur and providing structural rigidity preventing bending or damage during normal use.

As shown in FIG. 3, the beam 20A extends directly to the support bar 30 but is directed to that support bar at an angle so that it inclines at an angle to the end rail 11. The beam 20B connects to a further beam 20C which extends at an angle to the beam 20B and thus converges to the same end of the bar 30 as the beam 20A. A brace 20D extends from the other end of the bar 30 at an angle to the bar 20A so as to form a triangle therewith and is connected thereto at an apex 20E. Thus the bar 20C extends directly parallel to the end rail 11 but the bars 20A and 20B are inclined rearwardly so that the outer or rear end of the inner portion is inward of an imaginary line extending rearward from the end rail 11. Thus the whole of the arm including the wheel 28 is arranged in board of a plane containing the end rail 11. This is necessary since many arrangements of seeder when folded move to a position in which the end rail 11 of one wing is immediately adjacent to or abutting the end rail of the opposite wing so that there is no room for a marker which projects beyond the end rail 11.

Also as shown in FIGS. 2 and 3, the castor wheel 28 is located a position sufficiently spaced behind the packer wheels 14 that it can turn to a forward castor position should the implement require to reverse at any time.

A guide post 55 is mounted on the frame of the implement and stands vertically upwardly to abut an adjacent side surface of the beam 20A. This prevents the marker arm from pivoting in a counterclockwise as shown in FIG. 3 beyond the vertical post 55. The post 55 is braced by a diagonal brace 56. The post 55 includes a latching bar 57 which acts to hold the marker arm against the post 55 as the implement is folded and transported.

Figure 9:
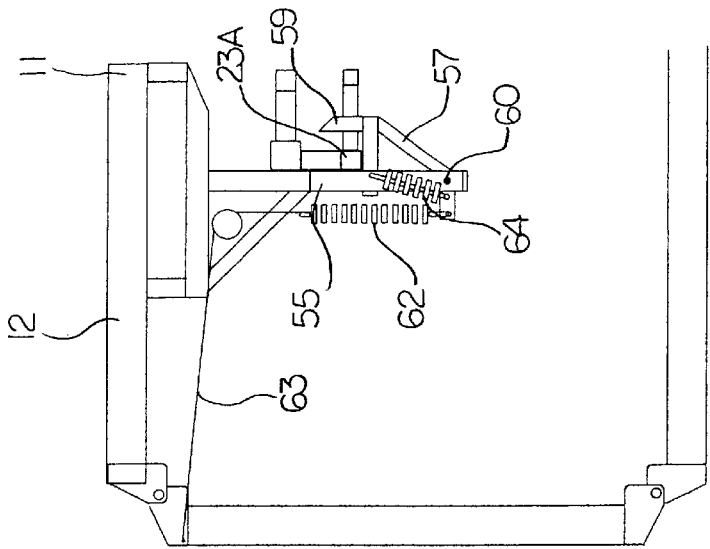
FIG. 9 is the same cross sectional view as that of FIGS. 7 and 8 showing the one end frame member of the implement and the marker attached thereto in a fully folded transport position of the implement.
Figure 7:
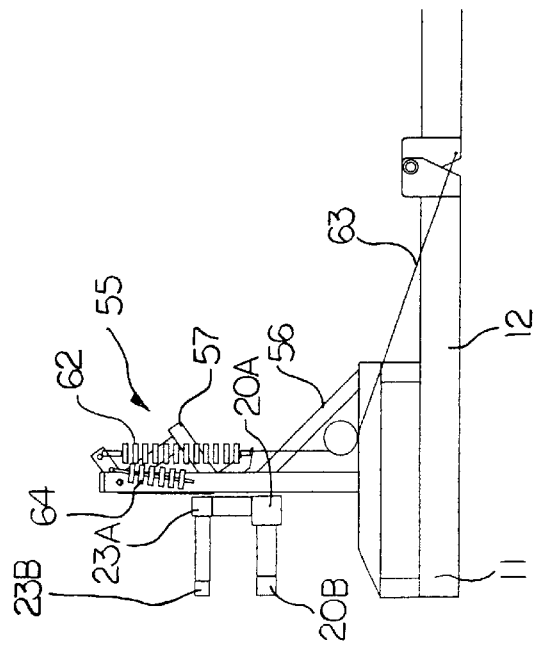
FIG. 7 is a cross sectional view taken along lines 7—7 of FIG. 2 showing one end frame member of the implement and the marker attached thereto in the retracted position.

Thus as shown in FIGS. 7, 8 and 9 the beams 20A and 23A slide on the side surface of the post 55. In FIG. 7 with the implement in the operating position, the latch arm 57 is retracted allowing the marker arm to freely slide up and down the post in the retracted trailing position. However, as the implement is partly folded in FIG. 8 to a position at 90°, the latch arm 57 is pulled into an extended position where an abutment 59 can engage over the beam 23A to hold the marker arm in position against the post 55. The latch arm 57 pivots about a pin 60 and includes a brace 61 sliding through the post 55. The latch arm is pulled into the extended position by a spring 62 actuated by a cable 63 from the folding mechanism of the implement. A compression spring 64 normally biases the latch arm into its retracted position shown in FIG. 7.

Figure 6:
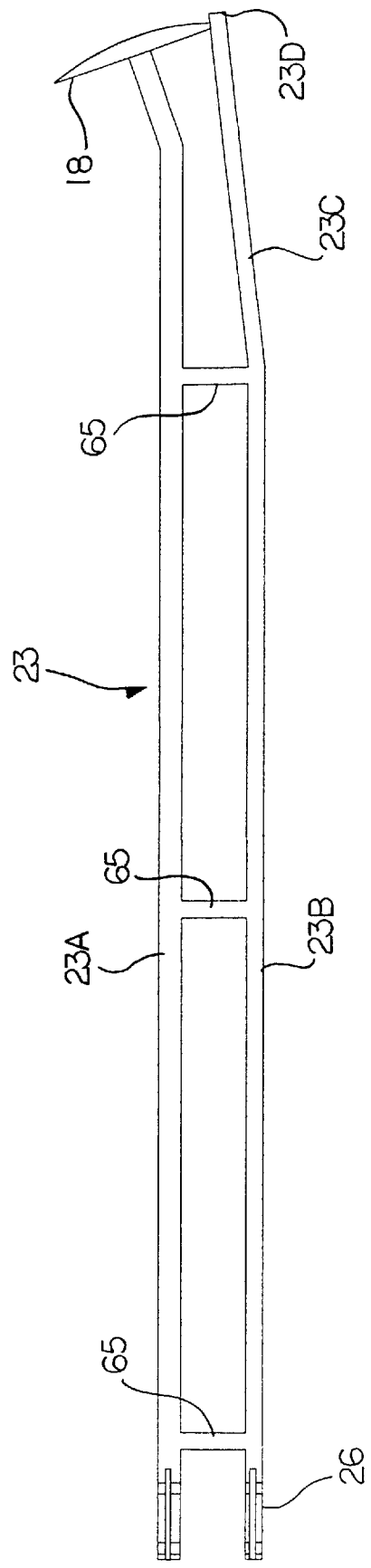
FIG. 6 is a top plan view showing the outer arm portion only of the marker arm in the deployed position.

Thus as the implement folds, the marker arm is held in position against the post 55 and is supported against the brace 61 in a situation where the frame moves beyond the position in FIG. 8 to a position shown in FIG. 9 in which the frame 10 of the wing is inverted. The beams 20A and 20B are connected by a plurality of connector struts for stiffness. In addition the beams 23A and 23B of the outer arm portion 23 are interconnected by further connector struts 65 in FIG. 6. The disc marker 18 is carried on the end of the beam 23A at a position beyond an end most one of the struts 65. The beam 23B extends beyond the end most strut 65 into a guard portion 23C which projects to an end 23D slightly beyond the disc 18 so as to move along the field in the operating position in advance of the disc to impact obstacles ahead of the disc and so as to prevent the disc becoming hooked around an obstacle which could then cause damage due to interfering with the proper tripping action. The guard portion 23C is at a slight angle to the beam 23B so as to extend outwardly and rearwardly so as to tend to deflect obstacles.

Figure 5:
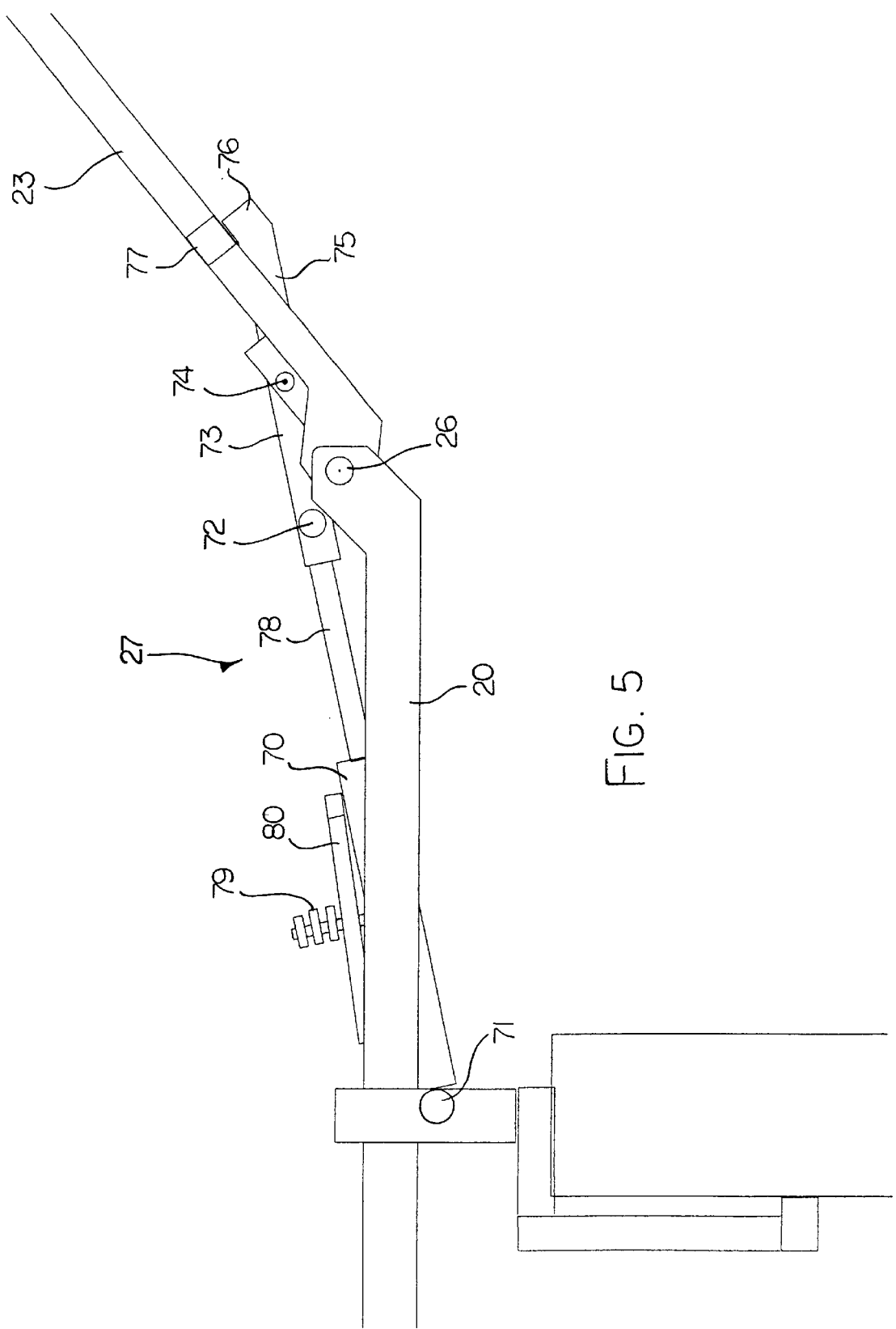
FIG. 5 is a front elevational view similar to that of FIG. 1 on an enlarged scale showing the marker in the action of moving to the retracted position.

Turning now to FIGS. 1 and 5, the lifting mechanism is shown in more detail. This comprises a cylinder 70 connected at its inner end to a pivot bracket 71. The cylinder 70 is spring biased downwardly toward the inner arm portion 20 so that it extends generally along the inner arm portion at a slight upwardly relative thereto to an outer bracket 72 at an actuating lever 73.

The actuating lever 73 is connected to a horizontal pivot 74 on the outer arm portion 23 so that it tends to pull the outer arm portion inwardly as the cylinder is retracted so as to pull the outer arm portion over the horizontal pivot axis defined by the pins 26 into the retracted position.

However, as the outer arm portion 23 is allowed to pivot upwardly and downwardly on the pins 26, it can move to a position in which the pivot 74 is over centre of the pins 26 thus preventing the lever from simply pulling the outer arm portion inwardly. In order to overcome this situation, the lever 74 includes an extension portion 75 extending beyond the pivot 74 to an abutment 76 which engages a member 77 on the outer arm portion. As shown in FIG. 1, when the cylinder 70 is in its fully extended position, the lever 73 is pivoted in a clockwise direction so that the abutment 76 leaves the member 77 allowing the outer arm portion to pivot upwardly and downwardly to accommodate ground contour. However, the first action when the cylinder 70 is actuated is to pull the lever in a counter clockwise direction rotating around the pivot 74 so that the abutment 76 lifts the outer arm portion and rotates it counter clockwise to a position shown in FIG. 5 whereupon the cylinder 70 and the piston rod 78 can act directly upon the lever 73 pulling upon the pivot 74.

In the extension operation, a spring 79 acting upon a bar 80 is provided to tend to rotate the cylinder 70 in a clockwise direction about the inner end 71 thus pushing the pivot 72 downwardly toward the outer end of the inner arm portion. In this position the piston rod 78 and the lever 73 are held in an over centre position relative to the pivot 72 thus causing the outer arm portion to pivot around the pins 26 into the extending position shown in FIG. 5 whereupon further extension movement causes the lever 73 to rotate in a clockwise direction until the pivot 72 returns to its initial outer position shown in FIG. 1.

The lever arrangement provided by the operating system 27 thus allows the movement of the outer arm portion to be smooth without jerks or portions of the movement is uncontrolled. At all times, the movement is actuated by the actuation of the cylinder or by gravity pushing against the cylinder.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A field marker comprising:
   a mounting member arranged for mounting on an agricultural implement at one side thereof;
   a marker arm attached to the mounting member for movement between a deployed position extending outwardly of the implement to one side thereof and a retracted position;
   a marker element carried on a free end of the marker arm for engaging the ground, when the arm is in the deployed position, and forming a mark on the ground parallel to movement of the implement across the ground;
   the marker arm including an inner arm portion having an inner end attached to the mounting member and an outer arm portion attached to an outer end of the inner arm portion with the marker element on an outer end of the outer arm portion;
   the inner arm portion being mounted on the mounting member for pivotal movement about a horizontal axis to allow the marker arm to move upwardly and downwardly relative to the implement;
   a ground support wheel mounted on the inner arm portion so as to support the outer end of the inner arm portion relative to the ground;
   the outer arm portion being mounted on the outer end of the inner arm portion for pivotal movement about a horizontal axis to allow the marker element to move upwardly and downwardly relative to the implement;
   a deployment member for effecting pivotal movement of the marker arm about a generally upright axis from the deployed position to a retracted position approximately 90° to the deployed position in which the marker arm trails rearwardly of the mounting member;
   the deployment member and the ground wheel being arranged relative to the marker arm such that the marker arm, in the deployed position of the marker arm, in_the retracted position of the marker arm and in any location between the deployed_position and the retracted position, is supported relative to the ground by contact of the ground wheel with the ground and is free to pivot relative to the mounting member about the horizontal axis.

2. The field marker according to claim 1 wherein the ground wheel is a castor wheel.

3. The field marker according to claim 1 wherein the outer arm portion is pivotally mounted on the inner arm portion for movement from a deployed position extending outwardly of the inner arm portion to a retracted position folded alongside the outer arm portion.

4. The field marker according to claim 3 wherein the outer arm portion pivots about a substantially horizontal axis so as to move upwardly onto a top of the inner arm portion.

5. The field marker according to claim 1 wherein each of the outer arm portion and the inner arm portion comprises two parallel bars lying in a substantially horizontal plane.

6. The field marker according to claim 1 wherein the marker arm and the ground wheel are arranged such that the marker arm extends rearwardly over a top of the implement frame in the retracted position.

7. The field marker according to claim 1 wherein there is provided an abutment post attached to the implement frame and standing upwardly therefrom at a position rearwardly of the mounting member for abutting the marker arm in the retracted position while allowing the marker arm to pivot upwardly and downwardly.

8. The field marker according to claim 7 wherein the abutment post includes a latch member movable to a latch position to engage the marker arm as the implement is folded upwardly to a folded position of the implement.

9. The field marker according to claim 1 wherein each of the inner and outer marker arm portions includes two bars arranged in common plane with one in advance of the other and wherein the marker element comprises a disc for rolling on the ground and wherein one bar of the outer portion extends outwardly to a position adjacent or just beyond the disc in advance of the disc to act as a guard bar for impacting any obstacle in advance of the disc.

10. The field marker according to claim 1 wherein the mounting member includes a compression spring pushing down on the marker arm so as to transfer weight from the mounting member outwardly to the ground wheel.

11. The field marker according to claim 1 including a cylinder for moving the arm from the deployed position to the retracted position and vice versa, a free end of the cylinder being mounted on a trip mechanism such that the marker arm can move to the retracted position if tripped by impact with an obstacle and such that when in the retracted position following a trip, the cylinder can be returned to the untripped position by actuating the cylinder to move the marker arm to the retracted position.

12. A field marker comprising:
   a mounting member arranged for mounting on an agricultural implement at one side thereof;
   a marker arm attached to the mounting member for movement between a deployed position extending outwardly of the implement to one side thereof and a retracted position;
   a marker element carried on a free end of the marker arm for engaging the ground, when the arm is in the deployed position, and forming a mark on the ground parallel to movement of the implement across the ground;
   the marker arm including an inner arm portion having an inner end attached to the mounting member and an outer arm portion attached to an outer end of the inner arm portion with the marker element on an outer end of the outer arm portion;
   the inner arm portion being mounted on the mounting member for pivotal movement about a horizontal axis to allow the marker arm to move upwardly and downwardly relative to the implement;
   a ground support wheel mounted on the inner arm portion so as to support the outer end of the inner arm portion relative to the ground;
   the outer arm portion being mounted on the outer end of the inner arm portion for pivotal movement about a horizontal axis to allow the marker element to move upwardly and downwardly relative to the implement;
   a deployment member for effecting pivotal movement of the marker arm about a generally upright axis from the deployed position to a retracted position approximately 90° to the deployed position in which the marker arm trails rearwardly of the mounting member;
   the deployment member and the ground wheel being arranged relative to the marker arm such that the marker arm, in the deployed position of the marker arm, in the retracted position of the marker arm and in any location between the deployed position and the retracted position, is supported relative to the ground by contact of the ground wheel with the ground and is free to pivot relative to the mounting member about the horizontal axis;
   wherein the marker arm and the mounting member are positioned within an outermost end member of the frame of the implement in a retracted position so as to avoid any projection beyond the outer most frame member.

13. The field marker according to claim 12 wherein each of the outer arm portion and the inner arm portion comprises two parallel bars lying in a substantially horizontal plane.

14. The field marker according to claim 12 wherein the marker arm and the ground wheel are arranged such that the marker arm extends rearwardly over a top of the implement frame in the retracted position.

15. The field marker according to claim 12 wherein there is provided an abutment post attached to the implement frame and standing upwardly therefrom at a position rearwardly of the mounting member for abutting the marker arm in the retracted position while allowing the marker arm to pivot upwardly and downwardly.

16. The field marker according to claim 15 wherein the abutment post includes a latch member movable to a latch position to engage the marker arm as the implement is folded upwardly to a folded position of the implement.

17. The field marker according to claim 12 wherein each of the inner and outer marker arm portions includes two bars arranged in common plane with one in advance of the other and wherein the marker element comprises a disc for rolling on the ground and wherein one bar of the outer portion extends outwardly to a position adjacent or just beyond the disc in advance of the disc to act as a guard bar for impacting any obstacle in advance of the disc.

18. The field marker according to claim 12 wherein the mounting member includes a compression spring pushing down on the marker arm so as to transfer weight from the mounting member outwardly to the ground wheel.

19. A field marker comprising:
   a mounting member arranged for mounting on an agricultural implement at one side thereof;
   a marker arm attached to the mounting member for movement between a deployed position extending outwardly of the implement to one side thereof and a retracted position;
   a marker element carried on a free end of the marker arm for engaging the ground, when the arm is in the deployed position, and forming a mark on the ground parallel to movement of the implement across the ground;
   the marker arm including an inner arm portion having an inner end attached to the mounting member and an outer arm portion attached to an outer end of the inner arm portion with the marker element on an outer end of the outer arm portion;
   the inner arm portion being mounted on the mounting member for pivotal movement about a horizontal axis to allow the marker arm to move upwardly and downwardly relative to the implement;
   a ground support wheel mounted on the inner arm portion so as to support the outer end of the inner arm portion relative to the ground;
   the outer arm portion being mounted on the outer end of the inner arm portion for pivotal movement about a horizontal axis to allow the marker element to move upwardly and downwardly relative to the implement;

a deployment member for effecting pivotal movement of the marker arm about a generally upright axis from the deployed position to a retracted position approximately 90° to the deployed position in which the marker arm trails rearwardly of the mounting member;

the deployment member and the ground wheel being arranged relative to the marker arm such that the marker arm, in the deployed position of the marker arm, in the retracted position of the marker arm and in any location between the deployed position and the retracted position, is supported relative to the ground by contact of the ground wheel with the ground and is free to pivot relative to the mounting member about the horizontal axis;

wherein the outer portion pivots upwardly and inwardly to a retracted position on top of the inner portion and wherein there is provided a lift cylinder for actuating movement of the outer portion while allowing pivotal movement of the outer portion relative to the inner portion when in the deployed position, the actuating cylinder including a lever pivotally mounted on the outer portion and including an abutment outwardly of the pivot for engaging the outer portion;

and wherein the lever includes a spring biasing the cylinder and lever into an overcenter position.

20. The field marker according to claim 19 wherein each of the inner and outer marker arm portions includes two bars arranged in common plane with one in advance of the other and wherein the marker element comprises a disc for rolling on the ground and wherein one bar of the outer portion extends outwardly to a position adjacent or just beyond the disc in advance of the disc to act as a guard bar for impacting any obstacle in advance of the disc.

* * * * *